(12) United States Patent
Meylan et al.

(10) Patent No.: US 7,899,396 B2
(45) Date of Patent: Mar. 1, 2011

(54) EFFICIENT OPERATION FOR CO-LOCATED WLAN AND BLUETOOTH

(75) Inventors: Arnaud Meylan, San Diego, CA (US); Ming Yan, San Diego, CA (US)

(73) Assignee: Qulacomm Incorporated, San Diego, CA (US)

( * ) Notice: Subject to any disclaimer, the term of this patent is extended or adjusted under 35 U.S.C. 154(b) by 1219 days.

(21) Appl. No.: 11/512,869

(22) Filed: Aug. 29, 2006

(65) Prior Publication Data

US 2007/0281617 A1   Dec. 6, 2007

Related U.S. Application Data

(60) Provisional application No. 60/810,524, filed on Jun. 2, 2006.

(51) Int. Cl.
*H04B 7/00* (2006.01)

(52) U.S. Cl. ............. 455/41.2; 455/448; 455/450; 455/452.2; 455/509; 455/556.2; 455/574; 370/329; 370/341; 370/338; 370/461; 370/506; 370/445; 709/227

(58) Field of Classification Search ............. 455/41.2, 455/450, 448, 63.1, 509, 436, 556.2, 574, 455/452.2; 370/461, 338, 331, 329, 341, 370/506; 709/227
See application file for complete search history.

(56) References Cited

U.S. PATENT DOCUMENTS

| | | | |
|---|---|---|---|
| 6,731,939 B1 * | 5/2004 | Watanabe et al. | 455/450 |
| 6,771,933 B1 * | 8/2004 | Eng et al. | 455/41.2 |
| 6,834,192 B1 * | 12/2004 | Watanabe et al. | 455/444 |
| 6,850,503 B2 * | 2/2005 | Dorenbosch et al. | 370/331 |

(Continued)

FOREIGN PATENT DOCUMENTS

| | | |
|---|---|---|
| WO | 2006115990 | 11/2006 |
| WO | 2007036687 | 4/2007 |

OTHER PUBLICATIONS

Chiasserini C F et al.: "Coexistence mechanisms for interference mitigation between IEEE 802.11 WLANs and bluetooth" Proceedings IEEE Infocom 2002. The Conference on Computer Communications. 21st. Annual Joint Coference of the IEEE Computer And Communications Societies. New York, NY, Jun. 23-27, 2002, Proceedings IEEE Infocom. The Conference on Computer Communica, vol. vol. 1 of 3. Conf. 21 Jun. 23, 2002, pp. 590-598, XP010593620 ISBN: 0-7803-7476-2 p. 592, right-hand column, line 4—p. 594, left hand.

(Continued)

*Primary Examiner*—Marceau Milord
(74) *Attorney, Agent, or Firm*—Peng Zhu; Abdollah Katbab

(57) ABSTRACT

Techniques to enable efficient operation of co-located WLAN and Bluetooth devices are described. A station (e.g., a cellular phone or a laptop computer) determines the activity of a Bluetooth device and ascertains idle periods of the Bluetooth device. The station communicates with an access point in a WLAN during the idle periods of the Bluetooth device. The station may operate in a power save mode with the access point, send a poll frame to the access point during an idle period, and retrieve the buffered data from the access point during the idle period. The station may also operate in an unscheduled APSD mode with the access point, send a trigger frame to the access point during an idle period to start a service period, and exchange data with the access point during the service period.

37 Claims, 6 Drawing Sheets

U.S. PATENT DOCUMENTS

| | | | |
|---|---|---|---|
| 6,954,616 B2 * | 10/2005 | Liang et al. | 455/63.1 |
| 7,006,481 B2 * | 2/2006 | Terry | 370/338 |
| 7,016,372 B2 * | 3/2006 | Haartsen | 370/461 |
| 7,050,452 B2 * | 5/2006 | Sugar et al. | 370/465 |
| 7,085,256 B2 * | 8/2006 | Ware et al. | 370/347 |
| 7,180,876 B1 * | 2/2007 | Henry et al. | 370/329 |
| 7,212,499 B2 * | 5/2007 | Hoffmann et al. | 370/252 |
| 7,215,659 B1 * | 5/2007 | Chen et al. | 370/338 |
| 7,245,946 B2 * | 7/2007 | Liu | 455/574 |
| 7,315,519 B2 * | 1/2008 | Sarikaya et al. | 370/310 |
| 7,352,997 B2 * | 4/2008 | Torvinen | 455/41.2 |
| 7,363,048 B2 * | 4/2008 | Cheng et al. | 455/517 |
| 7,406,296 B2 * | 7/2008 | Haartsen | 455/41.2 |
| 7,414,986 B2 * | 8/2008 | Kandala et al. | 370/310 |
| 7,424,007 B2 * | 9/2008 | Meier et al. | 370/352 |
| 7,453,857 B2 * | 11/2008 | Mangold et al. | 370/338 |
| 7,457,973 B2 * | 11/2008 | Liu | 713/310 |
| 7,480,490 B2 * | 1/2009 | Haartsen | 455/73 |
| 7,492,788 B2 * | 2/2009 | Zhang et al. | 370/468 |
| 7,508,781 B2 * | 3/2009 | Liu et al. | 370/311 |
| 7,542,728 B2 * | 6/2009 | Bitran et al. | 455/73 |
| 7,545,787 B2 * | 6/2009 | Bitran et al. | 370/338 |
| 2005/0025174 A1 | 2/2005 | Fischer | |
| 2005/0254444 A1 * | 11/2005 | Meier et al. | 370/312 |
| 2005/0276241 A1 | 12/2005 | Kamerman | |
| 2006/0031428 A1 * | 2/2006 | Wikman | 709/220 |
| 2007/0223430 A1 * | 9/2007 | Desai et al. | 370/338 |
| 2007/0224936 A1 * | 9/2007 | Desai | 455/41.2 |

OTHER PUBLICATIONS

Godfrey T: "802.11 and Bluetooth Coexistence Techniques" Technical Report CMU-CS-98-105, Nov. 4, 2002, XP002250571 p. 6-p. 11.
International Search Report—PCT/US07/069048, International Search Authority—European Patent Office—Nov. 9, 2007.
Ye Chen et al.: "Power management for VoIP over IEEE 802.11 WLAN" Wireless Communications And Networking Conference, 2004. WCNC. 2004 IEEE Atlanta, GA, USA Mar. 21-25, 2004, Piscataway, NJ, USA, IEEE, vol. 3, Mar. 21, 2004, pp. 1648-1653, XP010708196 ISBN: 0-7803-8344-3 paragraohs (00II), (IV.B), (000V).

* cited by examiner

EFFICIENT OPERATION FOR CO-LOCATED WLAN AND BLUETOOTH

CLAIM OF PRIORITY UNDER 35 U.S.C. §119

The present application claims priority to provisional U.S. Application Ser. No. 60/810,524, entitled "U-APSD/PS-POLL FOR CO-LOCATED WLAN AND BT," filed Jun. 2, 2006, assigned to the assignee hereof and incorporated herein by reference.

BACKGROUND

I. Field

The present disclosure relates generally to communication, and more specifically to techniques for operating in a wireless local area network (WLAN) that is co-located with Bluetooth.

II. Background

Many electronics devices support multiple communication protocols, which may also be referred to as radio technologies or air interfaces. For example, a laptop computer may use a wireless personal area network (WPAN) to connect to a wireless mouse, a wireless keyboard, and the like. The laptop computer may also have a device for communication with WLANs, which have become increasingly popular and are commonly deployed in homes, office buildings, coffee shops, libraries, and other public and private locations. A mobile device such as a cellular phone or a personal digital assistant (PDA) may also support multiple communication protocols such as cellular, WLAN, and Bluetooth. The mobile device may use WPAN to communicate with an earpiece and/or other devices. The mobile device may also be capable of providing email and Internet access as well as traditional cellular communication via the supported communication protocols.

A WPAN may utilize a communication protocol such as Bluetooth, which is a short-range communication protocol adopted as IEEE 802.15 standard by the Institute for Electrical and Electronic Engineers (IEEE). Bluetooth has an operating range of approximately ten meters. A WLAN may utilize any of the medium-range communication protocols in the IEEE 802.11 family of standards.

Some communication protocols operate on the same frequency band. For example, Bluetooth, IEEE 802.11, IEEE 802.11b, IEEE 802.11g, and some cordless phones all operate in the Industrial, Scientific and Medical (ISM) band between 2.4 giga-Hertz (GHz) and 2.4835 GHz. Bluetooth utilizes frequency hopping spread spectrum (FHSS). Cordless phones typically use proprietary radio techniques, which are permitted as long as they meet the regulatory requirements. Transmissions from a Bluetooth device are sent on 1 mega-Hertz (MHz) bandwidth and hop at a rate of 1600 times per second over 79 MHz in the ISM band. A WLAN device may implement IEEE 802.11b/g and may operate on a fixed frequency channel, which may be one of three non-overlapping frequency channels in the ISM band. In IEEE 802.11b/g, each frequency channel is 22 MHz for direct sequence spread spectrum (DSSS) or 16.7 MHz for orthogonal frequency division multiplexing (OFDM).

A Bluetooth device and a WLAN device may be co-located and in close proximity to one another. Co-location of these devices may entail using the same antenna, being located on the same circuit board or coupled circuit boards, being located on the same integrated circuit chip or coupled chip sets, being located within the same apparatus (e.g., a laptop computer or a mobile device), or any combination thereof. If the co-located devices are both operational, then there is some likelihood (approximately 28% chance) that a Bluetooth transmission will be sent on the frequency channel used by the WLAN device and would then interfere with a WLAN transmission.

When the Bluetooth and WLAN devices are co-located, a signal transmitted from one device may saturate a low noise amplifier (LNA) in a receiver of the other device, which may then cause the receiver to be desensitized. Thus, if the WLAN device is receiving a packet at the same time that the Bluetooth device is transmitting, then the transmit power of the Bluetooth device may spill into the receiver of the WLAN device and desensitize the receiver. The desensitization of the receiver may cause degradation in performance, loss of data, failure in communication, and/or other deleterious effects.

There is therefore a need in the art for techniques to avoid deleterious effects due to interference when a Bluetooth device and a WLAN device are co-located.

SUMMARY

Techniques to enable efficient operation of co-located WLAN and Bluetooth devices are described herein. In an aspect, a station (e.g., a cellular phone, a laptop computer, etc.) determines the activity of a Bluetooth device and ascertains idle periods of the Bluetooth device, e.g., based on a status signal indicating transmit and receive periods for the Bluetooth device. The station communicates with an access point in a WLAN during the idle periods of the Bluetooth device.

In an aspect, the station operates in a power save (PS) mode with the access point, sends a poll frame to the access point during an idle period, and retrieves the buffered data from the access point during the idle period. In another aspect, the station operates in an unscheduled Automatic Power Save Delivery (APSD) mode with the access point, sends a trigger frame to the access point during an idle period to start a service period, and exchanges data with the access point during the service period. The power save mode and the unscheduled APSD mode are described in IEEE 802.11 standards.

The station may perform a channel access procedure in an idle period and thereafter communicate with the access point for the remainder of the idle period. The station may delay sending a frame to the access point until the start of the idle period if the channel access procedure is completed prior to the start of the idle period. The station may refrain from sending a frame to the access point after a latest start time in the idle period. The station may send to the access point a serving deadline indicating the latest time for sending a frame from access point to the station. Various mechanisms for controlling WLAN transmission to reduce the likelihood of collision with Bluetooth transmission are described below.

Various aspects and features of the disclosure are described in further detail below.

BRIEF DESCRIPTION OF THE DRAWINGS

Aspects and features of the disclosure will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any aspect or design described herein as "exemplary" is not necessarily to be construed as preferred or advantageous over other aspects or designs.

Figure 1:
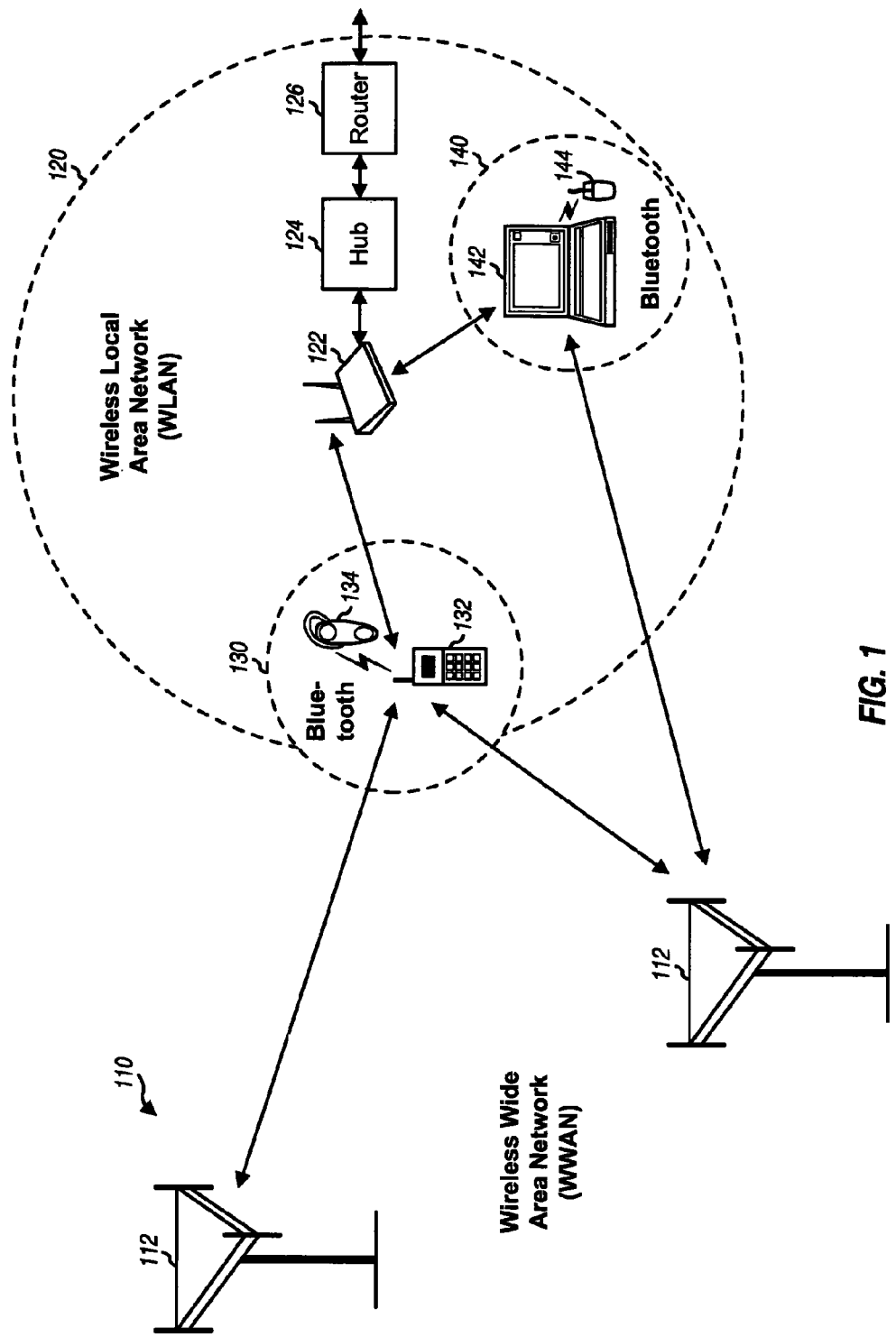
FIG. 1 shows a deployment of various wireless networks.

FIG. 1 shows an exemplary deployment of a wireless wide area network (WWAN) 110, a WLAN 120, and WPANs 130 and 140.

WWAN 110 provides communication coverage for a large geographic area such as, e.g., a city, a state, or an entire country. WWAN 110 may be a cellular network such as a Code Division Multiple Access (CDMA) network, a Time Division Multiple Access (TDMA) network, a Frequency Division Multiple Access (FDMA) network, or an Orthogonal FDMA (OFDMA) network. A CDMA network may utilize a communication protocol such as cdma2000 or Wideband-CDMA (W-CDMA). cdma2000 covers IS-95, IS-2000, and IS-856 standards. A TDMA network may utilize a communication protocol such as Global System for Mobile Communications (GSM). These various communication protocols and standards are known in the art. WWAN 110 typically includes many base stations 112 that support communication for wireless devices within the coverage area of the WWAN. For simplicity, only two base stations 112 are shown in FIG. 1. A base station is generally a fixed station that communicates with the wireless devices and may also be called a base transceiver station (BTS), a Node B, or some other terminology.

WLAN 120 provides communication coverage for a medium geographic area such as, e.g., a building, a home, and so on. WLAN 120 may include any number of access points that support communication for any number of stations. For simplicity, only one access point 122 is shown in FIG. 1. WLAN stations may also communicate directly with each other via peer-to-peer communication. WLAN 120 may implement IEEE 802.11, IEEE 802.11b, IEEE 802.11g and/or other WLAN standards. Access point 122 may couple to a local area network (LAN) via an Ethernet hub or switch 124. Ethernet hub 124 may couple to electronics devices such as personal computers, peripheral devices (e.g., facsimile machines, copiers, printers, scanners, etc.), servers, and the like, which are not shown in FIG. 1. Ethernet hub 124 may also couple to a router 126, which may exchange data packets with a wide area network (WAN), e.g., the Internet. Access point 122, Ethernet hub 124, and router 126 may also be combined in a single wireless router.

WPANs 130 and 140 provide communication coverage for small geographic areas. WPAN 130 supports communication between a cellular phone 132 and a headset 134. WPAN 140 provides wireless connectivity between a laptop computer 142 and a mouse 144. In general, each WPAN may include any number of WPAN devices. WPANs 130 and 140 may implement Bluetooth.

A station (STA) may be able to communicate with one or more wireless networks. A station may also be referred to as a mobile station, an access terminal, a user terminal, a user equipment, a mobile equipment, a subscriber unit, or some other terminology. A station may be a cellular phone, a smart phone, a cordless phone, a laptop computer, a PDA, a wireless device, a wireless modem, a mobile device, a handset, a handheld device, a satellite radio, a global positioning system, and so on.

In the example shown in FIG. 1, cellular phone 132 is a station that can communicate with WWAN 110, WLAN 120 and WPAN 130. Laptop computer 142 is a station that can communicate with WWAN 110, WLAN 120 and WPAN 140. A station may thus be a WWAN device (e.g., a cellular phone), a WLAN station, as well as a Bluetooth device.

WLAN 120 may support various communication services such as voice, video, packet data, and so on. WLAN 120 may support voice service using Voice over Internet Protocol (VoIP). With VoIP, voice data is sent in packets via the Internet just like other traffic data. A packet containing voice data is also referred to as a VoIP packet, a voice packet, and so on. Voice data and other types of data may be sent periodically. For example, a VoIP call may send a data frame every 10, 20, 40, or 60 milliseconds (ms). A frame is a unit of transmission between a station and an access point and may also be referred to as a packet, a data block, a data unit, a protocol data unit (PDU), a service data unit (SDU), a MAC PDU (MPDU), and so on.

IEEE 802.11 defines a power save (PS) mode for stations desiring to conserve battery power. A station that desires to go into the power save mode indicates this intention to an access point by setting a PS-mode bit to '1' in a medium access control (MAC) header of a frame sent to the access point. A station that is in the power save mode is referred to as a PS-station. The access point receives the PS-mode bit and recognizes that the PS-station will be sleeping and will wake up only at designated times to receive data. The access point then buffers any incoming data for the PS-station and delivers the data to the PS-station when it is awake.

Figure 2:
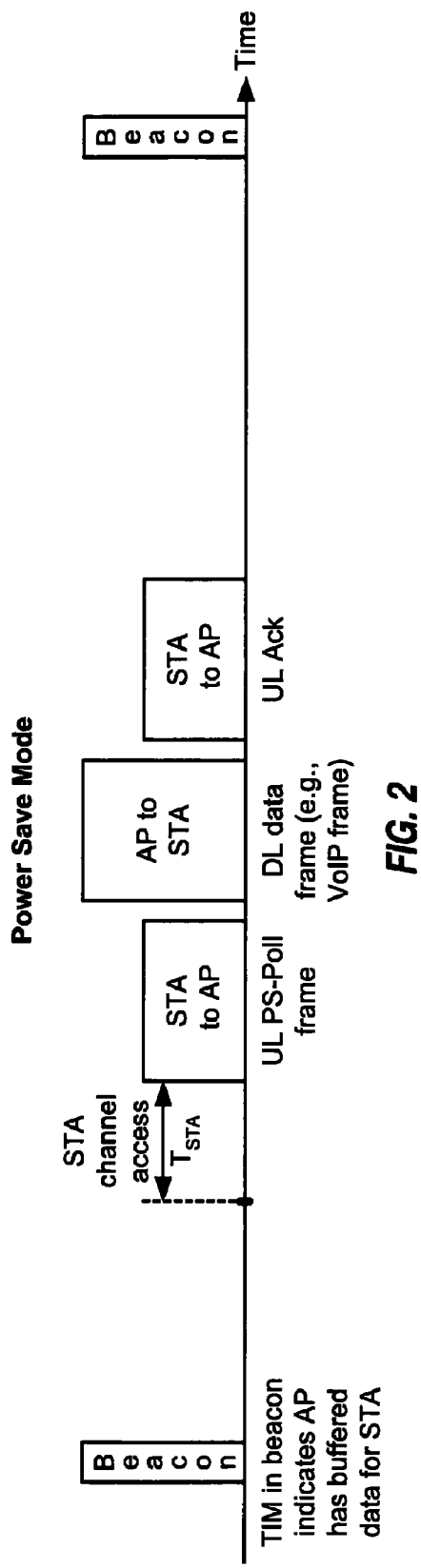
FIG. 2 shows operation in the power save mode.

FIG. 2 shows operation in the power save mode. An access point (AP) periodically transmits a beacon on the downlink. This beacon carries a preamble, an access point identifier (AP ID) that allows the stations to detect and identify the access point, and other system information. The time interval between the start of two consecutive beacons is called a beacon interval and may be set to a suitable duration, e.g., 100 ms. Stations within the vicinity of the access point may detect the beacon and attempt to associate with the access point.

The access point sends a Traffic Indication Map (TIM) in each beacon. The TIM is a bitmap that indicates whether there is buffered data for each station associated with the access point. At the time of association, a PS-station (STA) and the access point may negotiate a listen interval that determines how often the PS-station will wake up to listen for the beacon and hence receive the TIM. The listen interval is typically multiple times the beacon interval. For example, if the PS-station has a listen interval of five, then it may wake up at every fifth beacon to decode the TIM and receive potential data for the station. The access point sets the TIM for the PS-station, based on the listen interval, whenever the access point has data to send to the PS-station.

The PS-station may wake up to receive the TIM based on its listen interval. If the TIM indicates that data is available at the access point for the PS-station, then the PS-station may perform a carrier sense multiple access with collision avoidance (CSMA/CA) procedure defined by IEEE 802.11 to access the wireless medium/channel. The channel access may take a variable amount of time $T_{STA}$, which is dependent on whether the wireless medium is busy and the random value of the backoff. Upon gaining access to the wireless medium, the PS-station transmits a PS-Poll frame on the uplink (UL). The access point receives the PS-Poll frame and, in response, sends an Ack or a data frame on the downlink (DL) to the PS-station. The PS-station sends an acknowledgement (Ack) for the data frame. The access point may set a More Data bit in the data frame if it has more data for the PS-station. The sequence of PS-Poll frame, data frame, and Ack may be repeated if the data frame indicates more data available for the PS-station. In the power save mode, the access point buffers data for the PS-station and informs the station of data being available. The PS-station is responsible for initiating the retrieval of the buffered data and has control over when to receive the data from the access point.

IEEE 802.11e defines two Automatic Power Save Delivery (APSD) modes, which are referred to as scheduled APSD (S-APSD) and unscheduled APSD (U-APSD). Both APSD modes are used to provide power savings for stations. However, the two APSD modes operate in different manners.

Scheduled APSD utilizes centralized scheduling of service times by an access point. In scheduled APSD, transmissions for different stations are scheduled so that they do not collide with one another. A station wakes up prior to its scheduled service period to transmit and/or receive data and may power down as much circuitry as possible at the end of the service period to conserve battery power. Scheduled APSD operation generally requires more resources at the access point (e.g., to manage and schedule the stations) and more signaling on both the downlink and uplink (e.g., to set up the schedule). Hence, a WLAN may or may not support scheduled APSD.

Unscheduled APSD requires no centralized coordination. In unscheduled APSD, each station may independently choose its service times. A station receives the beacon from the access point to obtain system information and indicates to the access point that it enters the unscheduled APSD mode of operation. A station operating in the unscheduled APSD mode is referred to as a U-APSD station. On the uplink, the U-APSD station may initiate transmission whenever it has data to send. On the downlink, the access point buffers data for the U-APSD station until the access point receives an indication that the U-APSD station is ready to receive the data. Unlike the power save mode, the access point does not provide any indication of buffered data available at the access point for the U-APSD station. Instead, the U-APSD station periodically starts a service period (SP) by sending a trigger frame. This trigger frame indicates to the access point that the U-APSD station is awake and ready to receive data. The access point may send buffered data to the U-APSD station during the service period. Transmissions on both the uplink and downlink are thus controlled and initiated by the U-APSD station. The U-APSD station may select any schedule for sending data on the uplink and for querying the access point for data on the downlink. The U-APSD station does not need to inform the access point of the schedule. Unscheduled APSD may be used for predictable flows with tight delay requirements and is efficient for bi-direction communication with periodic flows on both the downlink and uplink, e.g., VoIP. In this case, the U-APSD station may send data on the uplink and concurrently query for downlink data.

Figure 3:
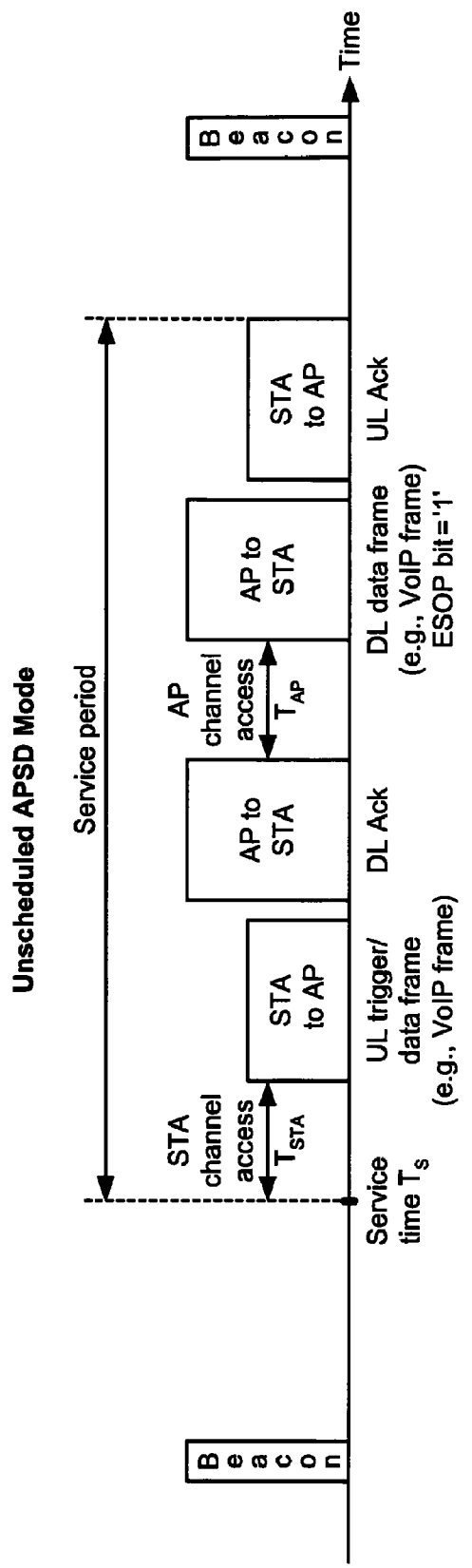
FIG. 3 shows operation in the unscheduled APSD mode.

FIG. 3 shows operation in the unscheduled APSD mode. The U-APSD station has data to send on the uplink or desires to query for downlink data from the access point. The U-APSD station selects a service start time of $T_S$ and performs an enhanced distributed channel access (EDCA) procedure defined by IEEE 802.11e to access the wireless medium. The channel access may take a variable amount of time $T_{STA}$, which is dependent on whether the wireless medium is busy and on the EDCA Access Category (AC) for the U-APSD station. Upon gaining access to the wireless medium, the U-APSD station transmits a trigger frame to initiates a service period. This trigger frame may be a data frame (e.g., a VoIP frame), a QoS Null frame, or some other frame with an indication that it is a trigger frame.

The access point receives the trigger/data frame from the U-APSD station and sends an Ack on the downlink to the U-APSD station. This Ack starts the service period. The access point may send data to the U-APSD station along with the Ack, which is not shown in FIG. 3. The U-APSD station uses the response (Ack or data) from the access point to confirm the start of the service period. The U-APSD station stays awake in the service period until it is terminated by the access point or the U-APSD station receives a beacon with the TIM set to zero to indicate that there is no buffered data for the station. The access point may not have downlink data ready to send to the U-APSD station and may simply send the Ack to confirm reception of the trigger frame and the start of the service period. The access point may then retrieve the data, perform channel access, and transmit data to the U-APSD station in a subsequent downlink data frame, as shown in FIG. 3. The U-APSD station may then send an Ack for the data frame. The access point may transmit a frame with an end-of-service-period (EOSP) bit set to '1' to indicate the end of the service period. The U-APSD station may go back to sleep at the end of the service period.

As shown in FIG. 3, for unscheduled APSD, the service period (1) is initiated when the U-APSD station sends a trigger frame and (2) ends when the access point sets the EOSP bit in a downlink frame or transmits the next beacon. The U-APSD station determines the start of the service period, and the access point determines the end of the service period.

The timelines in FIGS. 2 and 3 are not drawn to scale. For simplicity, FIGS. 2 and 3 show the data and Ack frames having equal duration. In general, the frames may have different durations, with the duration of each frame being dependent on the amount of data to send and the data rate used for the frame. The formats of various types of frames are described in IEEE 802.11 documents.

A station (e.g., cellular phone 132 or laptop computer 142) may utilize a WLAN device to communicate with WLAN 120, e.g., for a VoIP call or a packet data call. The station may also utilize a Bluetooth device to communicate with a Bluetooth apparatus (e.g., earpiece 134 or mouse 144). For example, cellular phone 132 may exchange VoIP packets with WLAN 120 and may forward the VoIP packets to earpiece 134 via Bluetooth. As another example, laptop computer 142 may exchange packet data with WLAN 120 and may also exchange data with mouse 144 via Bluetooth. The WLAN device and the Bluetooth device may be located in close proximity to one another, e.g., within the station. The transmission from one device may then cause interference to the other device.

Techniques to enable efficient operation of co-located WLAN and Bluetooth devices are described herein. In an aspect, a station determines the activity of the Bluetooth device and ascertains periods when the Bluetooth device is idle. The station controls data exchanges with an access point to coincide with the Bluetooth idle periods so that the probability of collision with Bluetooth traffic is reduced.

Bluetooth supports a number of packet types that may be used to send data. Five packet types, HV1, HV2, HV3, DM1 and DV, are defined for a synchronous connection-oriented (SCO) link, where HV stands for high-quality voice, DM stands for data-medium rate, and DV stands for data-voice. HV1, HV2 and HV3 are commonly used for audio and differ mainly by the code rate used for a packet.

Figure 4:
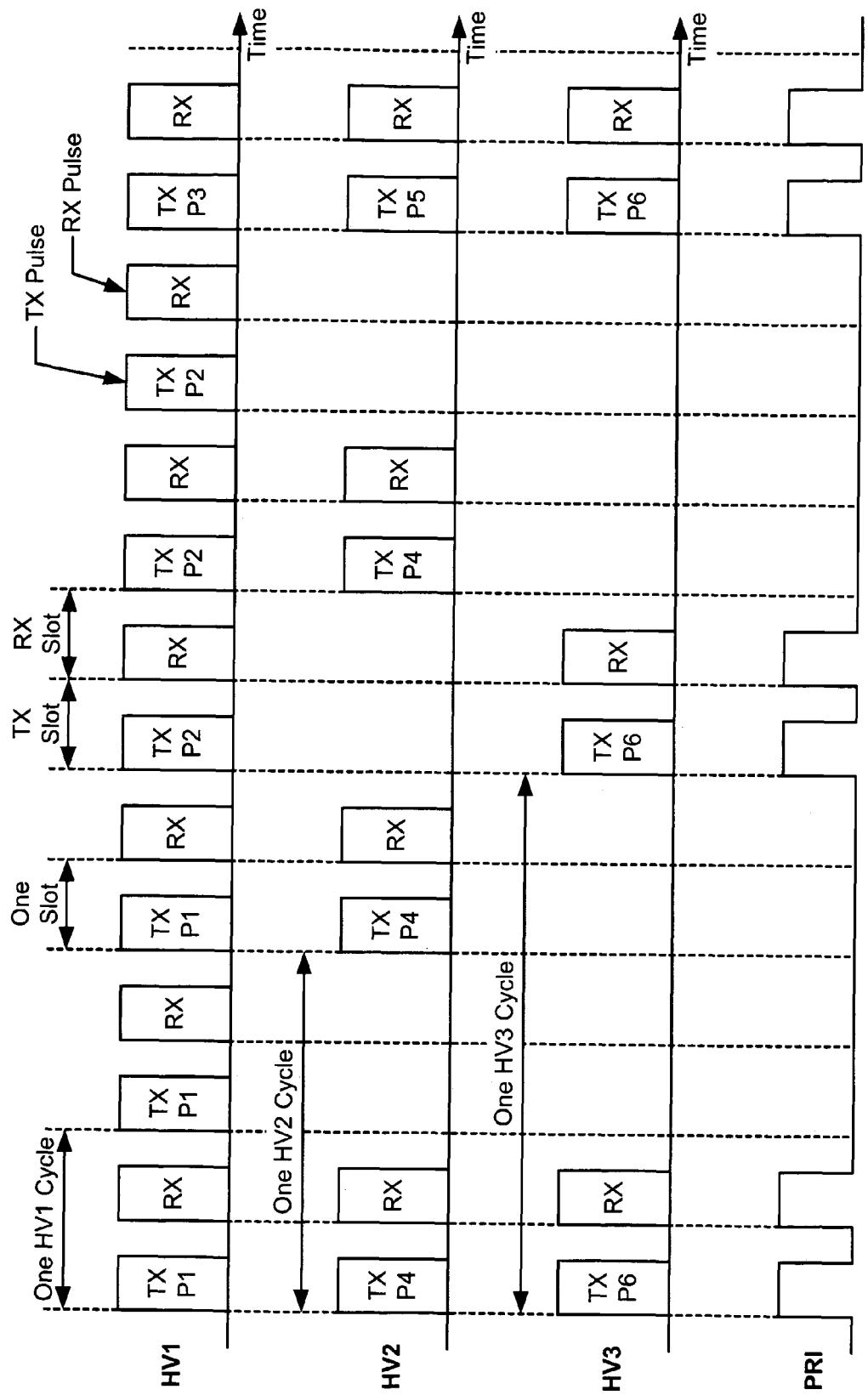
FIG. 4 shows Bluetooth transmissions for different packet types.

FIG. 4 shows exemplary transmissions by a Bluetooth device for HV1, HV2 and HV3. The transmission timeline in Bluetooth is partitioned into time slots, or simply, slots. Each slot has a duration of 625 microseconds (µs) and is identified by a 27-bit master clock (CLK) counter. The even-numbered slots are transmit (TX) slots for a master device, e.g., the station. The odd-numbered slots are receive (RX) slots for the master device and are also TX slots for a slave device, e.g., the earpiece or mouse. FIG. 4 shows the timeline for the master device.

For HV1, a packet of 80 information bits is encoded with a rate ⅓ forward error correction (FEC) code to generate 240 coded bits, which are transmitted in three consecutive TX slots. For HV2, a packet of 160 information bits is encoded with a rate ⅔ FEC code to generate 240 coded bits, which are transmitted in three (every other) TX slots. For HV3, a packet of 240 information bits is not encoded, and the 240 information bits are transmitted in three (every third) TX slots. The transmission in each TX slot occupies the first 366 µs of the slot. An idle slot is a slot that is not used to transmit or receive. As shown in FIG. 4, the TX and RX slots for HV1 are repeated every HV1 cycle of two slots, and there are no idle slots. The TX and RX slots for HV2 are repeated every HV2 cycle of four slots, and there are two idles slots in each HV2 cycle. The TX and RX slots for HV3 are repeated every HV3 cycle of six slots, and there are four idles slots in each HV3 cycle. Data is not sent or received during the idle slots.

In an aspect, the Bluetooth idle periods are determined based on a status signal from the Bluetooth device. The Bluetooth device has knowledge of slot timing, the packet type being used, and when Bluetooth traffic is transmitted and received. The Bluetooth device may generate a priority (PRI) line that indicates that the Bluetooth device desires priority to use the wireless medium. The PRI line may thus be indicative of transmit and receive activity of the Bluetooth device.

FIG. 4 shows an example of the PRI line for HV3. In this example, the PRI line is set to logic high during the active portion of the TX slots (or TX pulses) and also during the active portion of the RX slots (or RX pulses). The PRI line is set to logic low during the idle slots as well as the inactive portions of the TX and RX slots. In another example, the PRI line is set to logic high during the entire TX and RX slots and is set to logic low during the idle slots.

The station can ascertain the Bluetooth idle periods based on the PRI line. Each Bluetooth idle period may correspond to the time period from the end of an RX pulse to the start of the next TX pulse. Each Bluetooth idle period is approximately 2759 µs (5×625−366=2759) for HV3 and approximately 1509 µs (3×625−366=1509) for HV2. The station may ignore the inactive duration between adjacent TX and RX pulses. This duration is 259 µs (625−366=259) and most likely not long enough to access the wireless medium and transmit a data frame.

In another aspect, the Bluetooth idle periods are determined by detecting for Bluetooth transmissions sent and/or received by the Bluetooth device. Since Bluetooth pseudo-randomly hops across frequency in different slots, the detection may be performed in the frequency domain, e.g., by transforming a received signal to the frequency domain and examining each 1 MHz channel. A sufficient number of measurements may be made such that the Bluetooth active and idle periods can be ascertained with the desired certainty and timing accuracy. The measurements may be made continually (e.g., every HV3 cycle) or periodically (e.g., every second or some other time interval).

Once the Bluetooth idle periods are determined, the station may control data exchanges with the access point such that the probability of collision with Bluetooth traffic is reduced. The station may ensure that WLAN traffic is confined within the Bluetooth idle periods. The station may achieve this by using any of the power save modes in IEEE 802.11 and by exploiting the buffering capability of the access point. The techniques described herein may be used for the power save mode in IEEE 802.11, the scheduled and unscheduled APSD modes in IEEE 802.11e, and other modes. The techniques are described in detail below for the power save mode and the unscheduled APSD mode.

Figure 5:
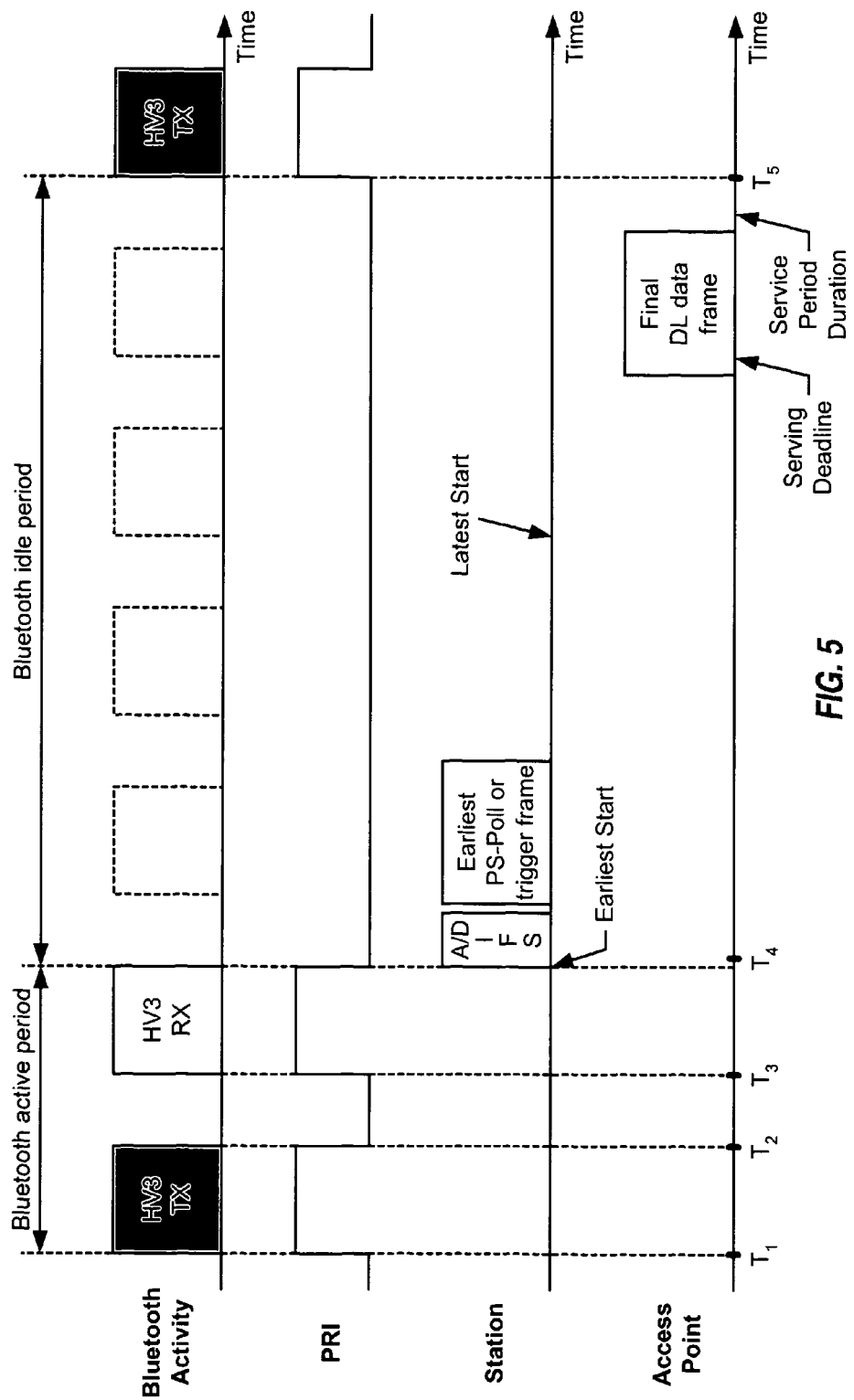
FIG. 5 shows WLAN operation during a Bluetooth idle period.

FIG. 5 shows an example of controlling WLAN operation based on Bluetooth traffic activity. FIG. 5 shows the case in which the Bluetooth device uses HV3. Each HV3 cycle includes a Bluetooth active period and a Bluetooth idle period. To avoid collision with Bluetooth traffic, the WLAN traffic may be confined to the Bluetooth idle period.

FIG. 5 also shows transmission timelines for the station and the access point. The earliest start time is the earliest time in which a frame may be sent by the station and may be defined to occur at the start of the Bluetooth idle period. The latest start time is the latest time in which a frame may be sent by the station. The serving deadline is the time instant after which the access point should stop serving the station to avoid colliding with the next Bluetooth transmission. The service period (SP) duration is the duration of the service period. The latest start time, serving deadline, and service period duration may be defined as described below.

For both the power save mode and the unscheduled APSD mode, the station initiates data transmission on the downlink and/or uplink. For the power save mode, the station performs the CSMA/CA channel access procedure and ensures that the wireless medium is idle for a distributed coordination function (DCF) interframe space (DIFS). The station may then send a PS-Poll frame or a data frame on the uplink to the access point. For unscheduled APSD mode, the station performs the EDCA channel access procedure and ensures that the wireless medium is idle for an arbitration interframe space (AIFS). The station may then send a trigger frame or a data frame on the uplink to the access point. The station and the access point may exchange one or more data frames during the Bluetooth idle period.

For the power save mode, the station may determine when to send a PS-Poll frame to retrieve buffered data at the access point based on the following:

Codec framing interval on the downlink, e.g., 10, 20, 40, or 60 ms for VoIP,

Bluetooth activity, e.g., as indicated by the PRI line,

Bluetooth packet type,

Presence of data available for transmission at the access point,

More Data bit being set in the last frame received from the access point,

Status of a play-out buffer at the station, and/or

Presence of buffered data at the access point as indicated by the TIM in the beacon.

The presence of data at the access point may be indicated in the TIM. For VoIP, the station may be able to guess that there is pending data even before the TIM is sent, e.g., the TIM may be sent every 100 ms whereas incoming VoIP data may be every 20 ms.

For the unscheduled APSD mode, the station may determine when to send a trigger frame based on the following:
  Codec framing interval on the downlink, e.g., 10, 20, 40, or 60 ms for VoIP,
  Bluetooth activity, e.g., as indicated by the PRI line,
  Bluetooth packet type,
  Presence of data available for transmission at the station,
  More Data bit being set in the last frame received from the access point,
  Status of a play-out buffer at the station, and/or
  Whether to send QoS null frames, instead of data, for codec with silence suppression.

The coder/decoder (codec) framing interval determines the periodicity in which data is sent. For example, a codec for a VoIP call may generate a data frame every 10, 20, 40, or 60 ms. Data may be sent at other intervals for other periodic flows. The packet type determines the duration of the Bluetooth idle periods, e.g., as shown in FIG. 4. The play-out buffer stores data to be played out.

For both the power save mode and the unscheduled APSD mode, WLAN operation during the Bluetooth idle period may be considered as including three phases—channel access, initiation, and termination. Each of these phases may be performed in various manners.

In one scheme for channel access, the station starts the channel access procedure at the beginning of the Bluetooth idle period, which is time $T_4$ in FIG. 5.

In another scheme for channel access, the station starts the channel access procedure prior to the beginning of the Bluetooth idle period. The channel access procedure includes a backoff procedure in which the station senses for an idle wireless medium. If the Bluetooth device transmits and then receives (TX/RX), as shown in FIG. 5, then the station may start the backoff procedure at the end of the TX pulse at time $T_2$ or at the start of the RX pulse at time $T_3$, instead of waiting until the start of the Bluetooth idle period at time $T_4$. If the channel access procedure is completed prior to the start of the Bluetooth idle period, then the station may delay its transmission until the start of the Bluetooth idle period at time $T_4$. If the Bluetooth device receives and then transmits (RX/TX), which is not shown in FIG. 5, then the station may start the channel access procedure early at the end of the RX pulse or the start of the TX pulse. However, any Bluetooth transmission during the TX pulse may act as interference and impair the detection of the idle wireless medium. In any case, this scheme may allow the station to transmit earlier.

The station typically implements a MAC service access point (SAP) that performs various functions for data transmission and reception. The MAC SAP may include a lower MAC and an upper MAC. The lower MAC may be responsible for certain tasks such as transmission and reception of frames, sending Ack for frames received properly, performing CSMA-CA channel access, and retransmission of un-Acked frames. The upper MAC may perform certain tasks such as sequence numbering, rate selection, and setting the Network Allocation Vector (NAV). The upper MAC typically invokes the lower MAC to perform certain task, and the lower MAC typically performs the requested task as quickly as possible. Various functions may be defined to provide more control over WLAN transmissions. These functions may be used for communication between the upper MAC and the lower MAC. A function may also be referred to as a primitive, a procedure, and so on.

A function BT_transmit (earliest_start, DATA) may be defined in the lower MAC to indicate that DATA may be sent as soon as the channel access procedure is completed, but no earlier than the earliest_start time. The earliest_start time may be defined relative to the time instant when the function is called or some other time reference. The earliest_start may be equal to the RX pulse duration if the function is called at the start of the RX pulse at time $T_3$. The earliest_start may be equal to one slot if the function is called at the end of the TX pulse at time $T_2$.

Upon completion of the channel access procedure, and if sufficient time remains in the Bluetooth idle period, the station may send a PS-Poll frame or a trigger frame to the access point to retrieve any buffered data and/or to send data to the access point. The station may estimate how likely the access point will send the buffered data in time to avoid collision with the next Bluetooth transmission. This estimation may be made based on serving time measurements for past transmissions from the access point to the station. The STA may also check the transmissions on the network to detect how many other stations are using the power save mode and how many have active data transfers which will affect the response time of the access point. For the power save mode, the station has control over when to send a PS-Poll frame but has no control over when the access point will respond with a data frame. The station may correlate statistics on the start time of the PS-Poll frame with the likelihood that the access point will send a data frame before the end of the Bluetooth idle period. For the unscheduled APSD mode, the station initiates the service period but the access point terminates the service period. The station may correlate statistics on the start time of the service period with the likelihood that the access point will serve the station before the end of the Bluetooth idle period.

For both modes, the station may take into account the time taken by the access point to respond to a PS-Poll frame or a trigger frame with a data frame on the downlink. The station may also take into account the traffic load in the WLAN. If necessary, the station may postpone the transmission of the PS-Poll frame or the trigger frame until the next Bluetooth idle period. For example, the access point may receive a voice packet for the station every 20 ms or approximately every five HV3 cycles. Thus, the station does not need to exchange data with the access point in each HV3 cycle. The station may wake up every 20 ms to trigger/poll the access point to retrieve buffered data. If there is insufficient remaining time in a given Bluetooth idle period, then the station may simply wait until the next Bluetooth idle period to retrieve the buffered data. For both modes, a goal is to ensure that the access point can complete its transmissions within the Bluetooth idle period with high probability.

A function BT_transmit (DATA, latest_start) may be defined to indicate that DATA may be sent as soon as the channel access procedure is completed, but no later than the latest_start time. The latest_start time may be defined relative to the time instant when the function is called or some other time reference. The latest_start may also be defined to be a predetermined time period from the end of the Bluetooth idle period. This predetermined time period may be one Bluetooth slot (e.g., for HV2), two slots (e.g., for HV3), or some other duration. In the example shown in FIG. 5, the latest_start may be equal to three slots if the function is called at the start of the RX pulse at time $T_3$.

A function BT_transmit (earliest_start, DATA, latest_start) may be defined to indicate that DATA may be sent as soon as the channel access procedure is complete, but no earlier than the earliest_start time, and no later than the latest_start time. If transmission on the wireless medium has not started by the latest_start time, then the transmission may be aborted.

For both the power save mode and the unscheduled APSD mode, the access point may take a variable amount of time to respond to a PS-Poll frame or a trigger frame from the station. This variable response time may result in the data transmission from the access point colliding with the next Bluetooth transmission. A function BT_transmit (DATA, serving_deadline) may be defined. The serving_deadline indicates the latest time that the access point can send a data frame to the station. The serving_deadline may be defined relative to when the function is invoked, when the PS-Poll or trigger frame is sent, or some other time reference. The serving_deadline may be sent to the access point in the PS-Poll frame or the trigger frame. The serving_deadline may also be configured for an entire association between the station and the access point and would not need to be sent in each PS-Poll or trigger frame.

For the unscheduled APSD mode, the station starts the service period but the access point terminates the service period. Various mechanisms may be used to allow the station to inform the access point that the service period should be terminated, when the Bluetooth idle period is about to elapse, so that the access point does not initiate a data transmission that will collide with the next Bluetooth transmission. Currently, service period duration may be signaled in units of frames, ranging from 2 to 6 frames. This way of defining service period duration may not be adequate since the number of frames does not provide a time bound.

A function BT_transmit (DATA, SP_duration) may be defined. The SP_duration indicates the duration of the service period and may be defined relative to when the function is invoked, when the trigger frame is sent, or some other time reference. The access point does not transmit frames after the service period has expired. In the example shown in FIG. 5, the SP_duration may be set to a value just smaller than 5 slots if it is defined relative to when the function is invoked and if the function is called at the start of the RX pulse at time $T_3$. The SP_duration may be sent to the access point in the trigger frame. The SP_duration may also be configured for the entire association between the station and the access point and would not need to be sent in each trigger frame. To avoid colliding with a Bluetooth transmission, the access point does not transmit frames after the service period has expired.

In general, various parameters may be used to control WLAN transmission to avoid collision with Bluetooth transmission. These parameters may include the following:
earliest_start—the earliest time that the station can transmit a frame,
latest_start—the latest time that the station can transmit a frame,
serving_deadline—the latest time that the access point can transmit a frame,
latest_end—the latest time for the end of a frame from the access point, and
SP_duration—the service period duration for the unscheduled APSD mode.

The serving_deadline indicates the latest time for the start of a frame and does not take into account the frame duration. The latest_end indicates the latest time for the end of the frame and takes into account the frame duration.

Other parameters may also be defined and used. Some parameters (e.g., earliest_start and latest_start) are applicable at the station. Other parameters (e.g., latest_end, serving_deadline, and SP_duration) are applicable at the access point and may be signaled or configured. Each parameter may be set to an appropriate value to reduce the likelihood of collision between WLAN and Bluetooth. The parameters may have different values depending on the duration of the Bluetooth idle period, which in turn may be dependent on the packet type used by the Bluetooth device and/or other factors.

Various functions with different combinations of parameters may also be defined. For example, the following functions may be defined:
BT_transmit (earliest_start, DATA),
BT_transmit (earliest_start, DATA, latest_start),
BT_transmit (earliest_start, DATA, latest_start, serving_deadline),
BT_transmit (earliest_start, DATA, latest_start, SP_duration), and
BT_transmit (earliest_start, DATA, latest_end).

Other functions may also be defined and used. The parameters in each function determine how DATA may be sent (or possibly not sent) during the Bluetooth idle period.

Figure 6:
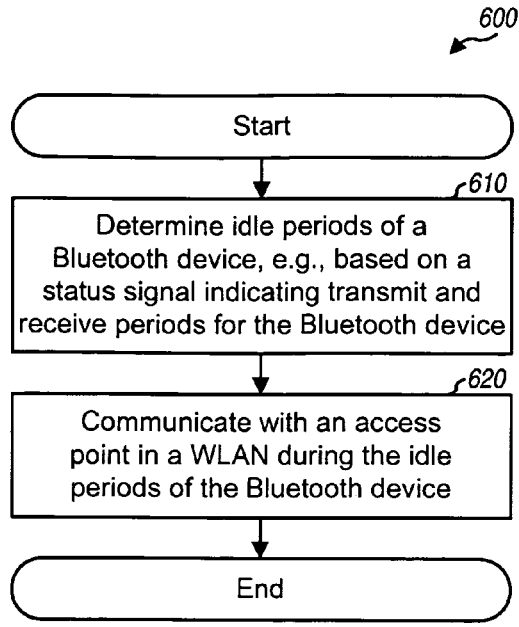
FIG. 6 shows a process for supporting co-located Bluetooth and WLAN.

FIG. 6 shows a process 600 performed by the station to support co-located Bluetooth and WLAN. The station determines idle periods of a Bluetooth device (block 610). This determination may be made based on a status signal indicating transmit and receive periods for the Bluetooth device, measurements for a received signal containing transmissions for the Bluetooth device, etc. The station communicates with an access point in a WLAN during the idle periods of the Bluetooth device (block 620).

The station may communicate with the access point in all idle periods or only some idle periods. The station may determine whether to communicate with the access point in a given idle period based on at least one condition, which may relate to the periodicity of data (e.g., the codec framing interval), presence of data at the access point for the station, presence of data at the station to send to the access point, or a combination thereof.

Figure 7:
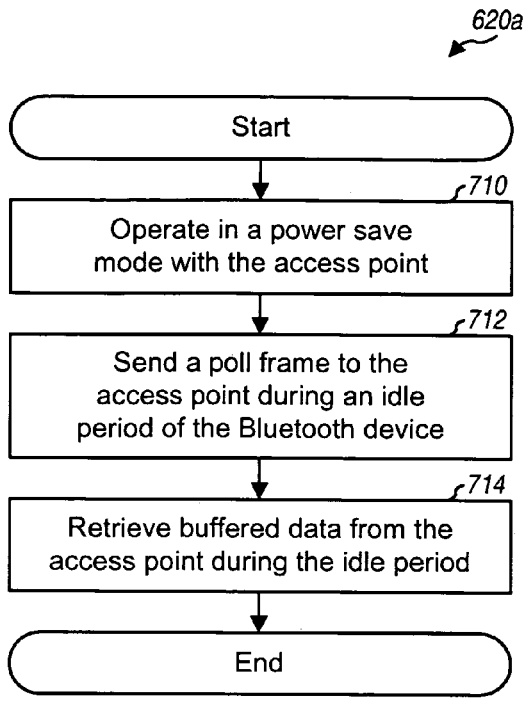
FIG. 7 shows a process for operating in the power save mode.

FIG. 7 shows a process 620a performed by the station. Process 620a is an example of block 620 in FIG. 6. The station operates in a power save mode with the access point (block 710). The station sends a poll frame (e.g., a PS-Poll frame) to the access point during an idle period of the Bluetooth device (block 712). The station retrieves buffered data from the access point during the idle period (block 714).

Figure 8:
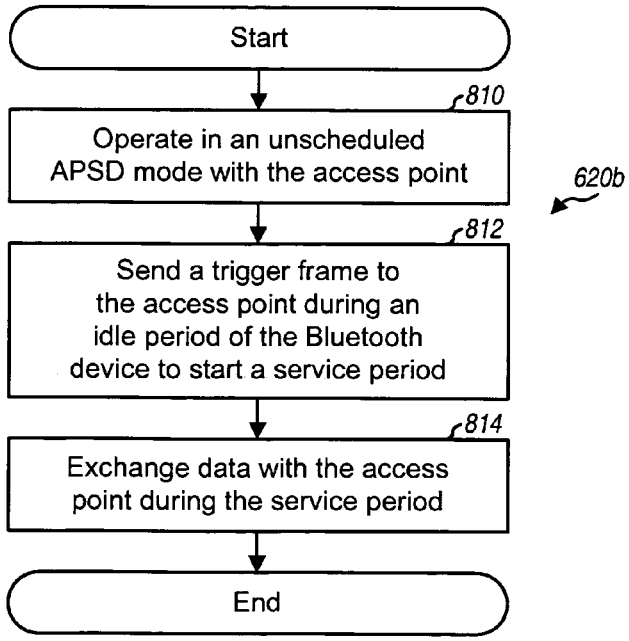
FIG. 8 shows a process for operating in the unscheduled APSD mode.

FIG. 8 shows a process 620b performed by the station. Process 620b is another example of block 620 in FIG. 6. The station operates in an unscheduled APSD mode with the access point (block 810). The station sends a trigger frame to the access point during an idle period of the Bluetooth device to start a service period (block 812). The station exchanges data with the access point during the service period (block 814). The station may send to the access point the service period duration, which may be selected based on the end of the idle period.

The station may perform a channel access procedure for a Bluetooth idle period and, after completing the channel access procedure, may communicate with the access point for the remainder of the idle period. The station may delay sending a frame to the access point until the start of the Bluetooth idle period if the channel access procedure is completed prior to the start of the idle period. The station may refrain from sending a frame to the access point after a latest start time in the idle period to avoid a likely collision between the access point traffic with Bluetooth traffic. The station may send to the access point a serving deadline indicating the latest time for sending a frame from access point to the station. The station may use a signaling method that is used only once to signal the presence, duration and periodicity of the Bluetooth interferer to the access point.

Figure 9:
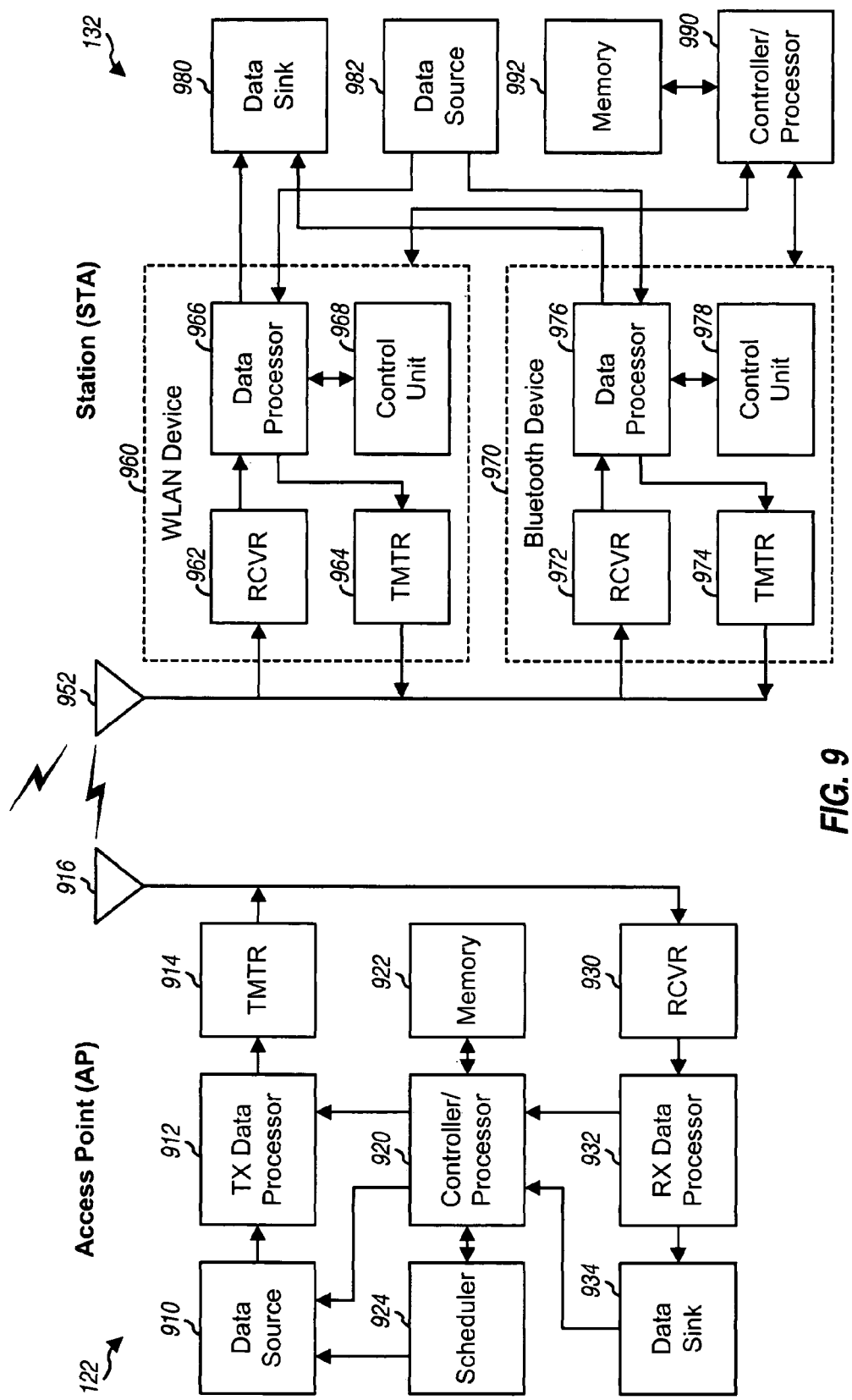
FIG. 9 shows a block diagram of an access point and a station.

FIG. 9 shows a block diagram of access point 122 and station 132. On the downlink, at access point 122, a TX data processor 912 receives traffic data from a data source 910 for the stations being served and control information (e.g., the TIM) from a controller/processor 920. TX data processor 912 processes (e.g., encodes, interleaves, modulates, and scrambles) the data for each station, processes the control information, and generates data chips. A transmitter (TMTR) 914 processes (e.g., converts to analog, amplifies, filters, and frequency upconverts) the data chips and generates a downlink signal, which is transmitted from an antenna 916 to the stations.

At station 132, an antenna 952 receives the downlink signal from access point 122 and other Bluetooth apparatus(es) and provides a received signal to a WLAN device 960 and a Bluetooth device 970. Within WLAN device 960, a receiver (RCVR) 962 processes the received signal and provides samples. A data processor 966 processes (e.g., descrambles, demodulates, deinterleaves, and decodes) the samples, provides decoded data to a data sink 980, and provides control information to a controller/processor 990. A control unit 968 directs the operation of receiver 962, transmitter 964, and data processor 966.

On the uplink, at station 132, data processor 966 receives traffic data from a data source 982 and control information (e.g., latest_end, serving_deadline, and/or SP_duration) from controller/processor 990. Data processor 966 processes the traffic data and control information and generates data chips. Transmitter 964 processes the data chips and generates an uplink signal, which is transmitted from antenna 952 to access point 122. At access point 122, antenna 916 receives the uplink signals from station 132 and other stations. A receiver 930 processes a received signal from antenna 916 and provides samples. An RX data processor 932 processes the samples and provides decoded data for each station to a data sink 934 and provides control information to controller/processor 920.

At station 132, Bluetooth device 970 may communicate with a Bluetooth apparatus such as earpiece 134. Within Bluetooth device 970, a receiver 972 processes the received signal and provides samples, a transmitter 974 processes data chips and generates an uplink signal, a data processor 976 performs data processing for Bluetooth for transmission and reception, and a control unit 978 directs the operation of receiver 972, transmitter 974, and data processor 976. Control unit 978 may generate and provide the PRI signal indicative of the transmit and receive periods for Bluetooth device 970.

Controllers/processors 920 and 990 direct operation at access point 122 and station 132, respectively. Controller/processor 990 may implement process 600 in FIG. 6, process 700 in FIG. 7, process 800 in FIG. 8, and/or other processes. Memories 922 and 992 store data and program codes for access point 122 and station 132, respectively. Scheduler 924 performs scheduling for the stations.

For clarity, the techniques have been specifically described for WLAN and Bluetooth. The techniques may be used for other systems and communication protocols. For example, the techniques may be used for other WPAN, WLAN and WWAN communication protocols. Station 132 may include any number of devices that support any number of communication protocols. For example, station 132 may include a GSM device, a CDMA device, a Bluetooth device, a WLAN device, an infrared device, and so on. These various devices may operate on the same frequency band or different frequency bands. Each device may be hardware, software, firmware, or a combination thereof. Coordination of transmission and reception by these devices may allow for concurrent communication across all supported communication protocols and may mitigate interference and data loss. Collision between different devices for communication protocols may be avoided by (1) not transmitting on one device while receiving on another device, (2) not transmitting simultaneously on multiple devices, and (3) not receiving simultaneously on multiple devices. These goals may be achieved as described above. The supported communication protocols may use time division multiplexing (TDM), and collision may be avoided by communicating on one device when the other devices are idle.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronics hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the present disclosure. Various modifications to the disclosure will be readily apparent to those skilled in the art, and the generic principles defined herein may be applied to other designs and implementations without departing from the spirit or scope of the disclosure. Thus, the present disclosure is not intended to be limited to the aspects and features shown herein but is to be accorded the widest scope consistent with the principles and novel aspects and features disclosed herein.

What is claimed is:

1. A station comprising:
    at least one processor configured to determine idle periods of a Bluetooth device and to communicate with an access point in a wireless local area network (WLAN) during the idle periods of the Bluetooth device, wherein the at least one processor is configured to obtain measurements for a received signal containing transmissions for the Bluetooth device, to determine the idle periods of the Bluetooth device based on the measurements, to further determine whether at least one condition is met for an idle period of the Bluetooth device, and to communicate with the access point in the idle period if the at least one condition is met; and
    a memory coupled to the at least one processor.

2. The station of claim 1, wherein the at least one processor is configured to receive a status signal indicating transmit and receive periods for the Bluetooth device, and to determine the idle periods of the Bluetooth device based on the status signal.

3. The station of claim 1, wherein the at least one processor is configured to determine the idle periods of the Bluetooth device based on a packet type used by the Bluetooth device.

4. The station of claim 1, wherein the at least one processor is configured to convey idle and active periods of the Bluetooth device to the access point.

5. The station of claim 1, wherein the at least one processor is configured to use a power save mode to obtain control of data delivery times of the access point, to initiate data delivery by the access point during the idle periods of the Bluetooth device, and to avoid initiating data delivery by the access point during active periods of the Bluetooth device.

6. The station of claim 1, wherein the at least one processor is configured to send a poll frame to the access point during an idle period of the Bluetooth device, and to retrieve buffered data from the access point during the idle period.

7. The station of claim 1, wherein the at least one processor is configured to operate in a power save (PS) mode with the access point, to send a PS-Poll frame to the access point during an idle period of the Bluetooth device, and to retrieve buffered data from the access point during the idle period.

8. The station of claim 1, wherein the at least one processor is configured to start an unscheduled service period with the access point during an idle period of the Bluetooth device, and to exchange data with the access point during the unscheduled service period.

9. The station of claim 8, wherein the at least one processor is configured to send to the access point a service period duration selected based on the end of the idle period.

10. The station of claim 1, wherein the at least one processor is configured to operate in an unscheduled Automatic Power Save Delivery (APSD) mode with the access point, to send a trigger frame to the access point during an idle period of the Bluetooth device to start an unscheduled service period, and to exchange data with the access point during the unscheduled service period.

11. The station of claim 1, wherein the at least one condition relates to periodicity of data, presence of data at the access point for the station, presence of data at the station to send to the access point, presence of more data to send from the access point to the station, packet type used by the Bluetooth device, activity of the Bluetooth device, or a combination thereof.

12. The station of claim 1, wherein the at least one processor is configured to determine whether sufficient time remains in an idle period of the Bluetooth device to complete a data exchange with the access point, and to send a frame to the access point if sufficient time remains in the idle period.

13. The station of claim 1, wherein the at least one processor is configured to perform a channel access procedure at or after the start of an idle period of the Bluetooth device, and to communicate with the access point for remainder of the idle period after completing the channel access procedure.

14. The station of claim 1, wherein the at least one processor is configured to refrain from sending a frame to the access point when there is insufficient time remaining in an idle period of the Bluetooth device to ensure completion of a data exchange with the access point.

15. The station of claim 14, wherein the at least one processor is configured to determine the latest start time based on a function of link data rate, application data rate, link packet error rate, statistics collected on turn around time and serving policies for the access point, or a combination thereof.

16. The station of claim 1, wherein the at least one processor is configured to refrain from sending a frame to the access point if insufficient time remains in an idle period of the Bluetooth device to complete a data exchange with the access point.

17. The station of claim 1, wherein the at least one processor is configured to send to the access point a serving deadline indicating a latest time for sending a frame from access point to the station.

18. The station of claim 1, wherein the at least one processor is configured to send to the access point information indicative of activity of the Bluetooth device, the information being used for remaining duration of a flow between the station and the access point.

19. A station comprising:
    at least one processor configured to determine idle periods of a Bluetooth device and to communicate with an access point in a wireless local area network (WLAN) during the idle periods of the Bluetooth device, wherein the at least one processor is configured to obtain measurements for a received signal containing transmissions for the Bluetooth device, to determine the idle periods of the Bluetooth device based on the measurements, to perform a channel access procedure prior to the start of an idle period of the Bluetooth device, to delay sending a frame to the access point until the start of the idle period if the channel access procedure is completed prior to the start of the idle period, and to communicate with the access point for remainder of the idle period; and
    a memory coupled to the at least one processor.

20. A method of operating a station, comprising:
    determining idle periods of a Bluetooth device; and
    communicating with an access point in a wireless local area network (WLAN) during the idle periods of the Bluetooth device comprising:
    performing a channel access procedure for an idle period of the Bluetooth device, delaying transmission of a frame to the access point until the start of the idle period if the channel access procedure is completed prior to the start of the idle period, and communicating with the access point for remainder of the idle period.

21. The method of claim 20, wherein the determining the idle periods of the Bluetooth device comprises receiving a status signal indicating transmit and receive periods for the Bluetooth device, and determining the idle periods of the Bluetooth device based on the status signal.

22. An apparatus comprising:

means for determining idle periods of a Bluetooth device; and means for communicating with an access point in a wireless local area network (WLAN) during the idle periods of the Bluetooth device comprising:

means for performing a channel access, procedure for an idle period of the Bluetooth device, means for delaying transmission of a frame to the access point until the start of the idle period if the channel access procedure is completed prior to the start of the idle period, and means for communicating with the access point for remainder of the idle period.

23. The apparatus of claim 22, wherein the means for determining the idle periods of the Bluetooth device comprises means for receiving a status signal indicating transmit and receive periods for the Bluetooth device, and means for determining the idle periods of the Bluetooth device based on the status signal.

24. A computer-readable medium including instructions stored thereon, comprising:

a first instruction set for determining idle periods of a Bluetooth device; and a second instruction set for directing communication with an access point in a wireless local area network (WLAN) during the idle periods of the Bluetooth device comprising:

a third instruction set for performing a channel access procedure for an idle period of the Bluetooth device, a fourth instruction set for delaying transmission of a frame to the access point until the start of the idle period if the channel access procedure is completed prior to the start of the idle period, and a fifth instruction set for communicating with the access point for remainder of the idle period.

25. The computer-readable medium of claim 24, wherein the first instruction set comprises a third instruction set for receiving a status signal indicating transmit and receive periods for the Bluetooth device, and a fourth instruction set for determining the idle periods of the Bluetooth device based on the status signal.

26. An access point comprising:

at least one processor configured to receive information indicative of activity of an interfering radio device at a station, wherein the station determined the activity of the interfering radio device by measuring a received signal containing transmissions for the interfering radio device, to determine an idle period of the interfering radio device based on the received information, to further determine whether at least one condition is met for the idle period of the interfering radio device, and to communicate with the station during the idle period of the interfering radio device; and a memory coupled to the at least one processor.

27. The access point of claim 26, wherein the interfering radio device is a Bluetooth device, a Global System for Mobile Communications (GSM) device, or a wireless local area network (WLAN) device.

28. The access point of claim 26, wherein the at least one processor is configured to receive the information in a poll frame or a trigger frame sent by the station.

29. The access point of claim 26, wherein the at least one processor is configured to receive the information via signaling sent by the station and to determine idle periods of the interfering radio device for remaining duration of a flow between the station and the access point based on the received information.

30. The access point of claim 26, wherein the received information comprises a serving deadline indicating a latest time for sending a frame from the access point to the station, and wherein the at least one processor is configured to refrain from serving the station after the serving deadline.

31. A station comprising:

at least one processor configured to determine idle periods of a first device operating in accordance with a first communication protocol, wherein the idle periods of the first device are determined by measuring a received signal containing transmissions for the first device, to convey the idle periods of the first device to a second device, to further determine whether at least one condition is met for an idle period of the first device, to enable communication by the second device operating in accordance with a second communication protocol during the idle periods of the first device; and a memory coupled to the at least one processor.

32. The station of claim 31, wherein the first device is a Bluetooth device and the second device is a wireless local area network (WLAN) device.

33. The station of claim 31, wherein the first device is a Global System for Mobile Communications (GSM) device and the second device is a wireless local area network (WLAN) device.

34. The station of claim 31, wherein the first and second communication protocols use time division multiplexing (TDM).

35. A method for operating a station comprising:

determining idle periods of a Bluetooth device, wherein the idle periods are determined by obtaining measurements for a received signal containing transmissions for the Bluetooth device and determining the idle periods of the Bluetooth device based on the measurements, and further determining whether at least one condition is met for an idle period of the Bluetooth device; and communicating with an access point in a wireless local area network (WLAN) during the idle periods of the Bluetooth device.

36. An apparatus for operating a station comprising:

means for determining idle periods of a Bluetooth device, wherein the idle periods are determined by obtaining measurements for a received signal containing transmissions for the Bluetooth device and determining the idle periods of the Bluetooth device based on the measurements;

means for determining whether at least one condition is met for an idle period of the Bluetooth device; and means for communicating with an access point in a wireless local area network (WLAN) during the idle periods of the Bluetooth device.

37. A computer-readable medium including instructions stored thereon, comprising:

instructions for determining idle periods of a Bluetooth device, wherein the idle periods are determined by obtaining measurements for a received signal containing transmissions for the Bluetooth, device and determining the idle periods of the Bluetooth device based on the measurements, and further determining whether at least one condition is met for an idle period of the Bluetooth device; and instructions for communicating with an access point in a wireless local area network (WLAN) during the idle periods of the Bluetooth device.

* * * * *